United States Patent
Kim et al.

(10) Patent No.: US 7,102,715 B2
(45) Date of Patent: Sep. 5, 2006

(54) DUAL DISPLAY LIQUID CRYSTAL DISPLAY DEVICE, METHOD OF OPERATING THE SAME, AND MOBILE COMMUNICATION TERMINAL INCLUDING THE SAME

(75) Inventors: Kyeong Jin Kim, Gyeongsangbuk-do (KR); Hoon Kang, Gyeongsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 115 days.

(21) Appl. No.: 10/739,303

(22) Filed: Dec. 19, 2003

(65) Prior Publication Data
US 2004/0189902 A1    Sep. 30, 2004

(30) Foreign Application Priority Data
Mar. 27, 2003    (KR) ...................... 10-2003-0019102

(51) Int. Cl.
*G02F 1/1335* (2006.01)
(52) U.S. Cl. .................... 349/114; 349/96; 349/115; 349/117; 349/119
(58) Field of Classification Search ................ 349/96, 349/98, 113–115, 117, 119
See application file for complete search history.

(56) References Cited

U.S. PATENT DOCUMENTS

| | | | |
|---|---|---|---|
| 5,790,214 A | | 8/1998 | Park .......................... 349/69 |
| 5,841,494 A | * | 11/1998 | Hall ............................ 349/98 |
| 5,899,551 A | * | 5/1999 | Neijzen et al. ............. 349/115 |
| 5,986,730 A | * | 11/1999 | Hansen et al. ................ 349/96 |
| 6,132,048 A | * | 10/2000 | Gao et al. ...................... 353/20 |
| 6,285,422 B1 | * | 9/2001 | Maeda et al. ................. 349/96 |
| 6,757,039 B1 | * | 6/2004 | Ma .............................. 349/115 |
| 2004/0113162 A1 | * | 6/2004 | Mai ............................. 257/88 |
| 2004/0189901 A1 | * | 9/2004 | Kim et al. ................... 349/114 |

FOREIGN PATENT DOCUMENTS

| | | |
|---|---|---|
| JP | 11-7259 | 1/1999 |
| JP | 2000-193956 | 7/2000 |
| JP | 2001-013502 | 1/2001 |
| WO | WO 00/36578 | 6/2000 |

* cited by examiner

*Primary Examiner*—Tarifur R. Chowdhury
(74) *Attorney, Agent, or Firm*—McKenna Long & Aldridge LLP

(57) ABSTRACT

A dual display liquid crystal display (LCD) device includes a front light unit for supplying a light, a first polarizing plate disposed on the front light unit, a first phase compensation film disposed on the first polarizing plate, an LCD panel disposed on the first phase compensation film, a selective reflection/transmission unit disposed on the LCD panel, a second phase compensation film disposed on the selective reflection/transmission unit, and a second polarizing plate disposed on the second phase compensation film, wherein the selective reflection/transmission unit selectively reflects and transmits the incident light so that the dual display LCD device operates in reflection mode to display an image on a front side thereof in a first display mode and operates in a transmission mode to display an image on a rear side thereof in a second display mode.

21 Claims, 9 Drawing Sheets

The case that a voltage is not applied

The case that a voltage is not applied

The case that a voltage is applied

The case that a voltage is not applied

The case that a voltage is applied

The case that a voltage is not applied

The case that a voltage is not applied

DUAL DISPLAY LIQUID CRYSTAL DISPLAY DEVICE, METHOD OF OPERATING THE SAME, AND MOBILE COMMUNICATION TERMINAL INCLUDING THE SAME

The present invention claims the benefit of Korean Patent Application No. 19102/2003 filed in Korea on Mar. 27, 2003, which is hereby incorporated by reference.

BACKGROUND OF THE INVENTION

1. Field of the Invention

The present invention relates to a liquid crystal display (LCD) device, and more particularly, to a dual display LCD device in which images can be displayed on both front and rear sides of a single LCD panel.

2. Description of the Related Art

In general, cathode ray tube (CRT) devices have proven to be inconvenient because of their large size and weight. Accordingly, thin flat panel displays have been developed that can be installed and used anywhere because of their slim profile and large display area. Thus, flat panel displays are replacing the CRT devices. For example, thin film transistor liquid crystal display (TFT-LCD) devices have excellent resolution and fast response speeds for displaying moving images.

The operation principle of the LCD device is based on the optical anisotropy and polarization properties of liquid crystal molecules. Since liquid crystal molecules have thin and long structures, it is possible to control the alignment direction of the liquid crystal molecules by application of an electric field. Thus, light transmission between the liquid crystal molecules may be controlled by controlling an alignment direction of the liquid crystal molecules, thereby displaying images.

Active matrix LCD devices are commonly provided with active elements having nonlinear characteristics on pixels arranged in a matrix configuration. The active matrix LCD device can display images by controlling operation of each pixel using the active elements. However, the active matrix LCD devices only display images on a single side of a display panel.

SUMMARY OF THE INVENTION

Accordingly, the present invention is directed to a dual display liquid crystal display device and a method of operating a dual display liquid crystal display device that substantially obviates one or more problems due to limitations and disadvantages of the related art.

An object of the present invention is to provide a dual display LCD device that displays images on both front and rear sides of a single LCD panel.

Another object of the present invention is to provide a method of operating a dual display LCD device that displays images on both front and rear sides of a single LCD panel.

Another object of the present invention is to provide a mobile communication terminal capable of displaying images on both front and rear sides of a single LCD panel in dual display LCD device employing a single LCD panel.

Additional features and advantages of the invention will be set forth in the description which follows, and in part will be apparent form the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, a dual display liquid crystal display (LCD) device includes a front light unit for supplying a light, a first polarizing plate disposed on the front light unit, a first phase compensation film disposed on the first polarizing plate, an LCD panel disposed on the first phase compensation film, a selective reflection/transmission unit disposed on the LCD panel, a second phase compensation film disposed on the selective reflection/transmission unit, and a second polarizing plate disposed on the second phase compensation film, wherein the selective reflection/transmission unit selectively reflects and transmits the incident light so that the dual display LCD device operates in reflection mode to display an image on a front side thereof in a first display mode and operates in a transmission mode to display an image on a rear side thereof in a second display mode.

In another aspect, a method of operating a dual display LCD device includes receiving light emitted from a front light unit and converting the received light into a circularly polarized light, allowing the circularly polarized light to be incident into an LCD panel and controlling one of a left-handed circular polarization and right-handed circular polarization of the light transmitted through the LCD panel according to an applied voltage, and allowing the light transmitted through the LCD panel to be incident into a selective reflection/transmission unit and selectively reflecting and transmitting the incident light at the selective reflection/transmission unit depending on the one of the left-handed circular polarization and right-handed circular polarization of the light transmitted through the LCD panel, wherein the dual display LCD device operates in reflection mode to display an image on a front side thereof in a first display mode and operates in a transmission mode to display an image on a rear side thereof in a second display mode.

In another aspect, a mobile communication terminal includes a dual display LCD device comprising a front light unit for supplying a light, a first polarizing plate disposed on the front light unit, a first phase compensation film disposed on the first polarizing plate, an LCD panel disposed on the first phase compensation film, a selective reflection/transmission unit disposed on the LCD panel, a second phase compensation film disposed on the selective reflection/transmission unit, and a second polarizing plate disposed on the second phase compensation film, wherein the dual display LCD device selectively reflects and transmits the light applied from the selective reflection/transmission unit so that the dual display LCD device operates in a reflection mode to display an image on a front side thereof in a first display mode and operates in a transmission mode to display an image on a rear side thereof in a second display mode, a communication system for communicating with an external side, and a controller for controlling the communication system and the dual display LCD device and controlling direction of displaying an image of the dual display LCD device.

In another aspect, a dual display LCD device includes a front light unit for supplying a light, a first polarizing unit disposed on the front light unit, an LCD panel disposed on the first polarizing unit, a selective reflection/transmission unit disposed on the LCD panel, and a second polarizing unit disposed on the selective reflection/transmission unit, wherein the selective reflection/transmission unit selectively reflects and transmits the incident light so that the dual display LCD device operates in a reflection mode to display the image on a front side thereof in a first display mode and operates in a transmission mode to display an image on a rear side thereof in a second display mode.

In another aspect, a mobile communication terminal includes a dual display LCD device comprising a front light unit for supplying a light, a first polarizing unit disposed on the front light unit, an LCD panel disposed on the first polarizing unit, a selective reflection/transmission unit disposed on the LCD panel, and a second polarizing unit disposed on the selective reflection/transmission unit, wherein the selective reflection/transmission unit selectively reflects and transmits the incident light so that the dual display LCD device operates in a reflection mode to display an image on a front side thereof in a first display mode and operates in a transmission mode to display an image on a rear side thereof in a second display mode, a communication system for communicating with an external side, and a controller for controlling the communication system and the dual display LCD device and controlling direction of displaying the image of the dual display LCD device.

It is to be understood that both the foregoing general description and the following detailed description of the present invention are exemplary and explanatory and are intended -to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
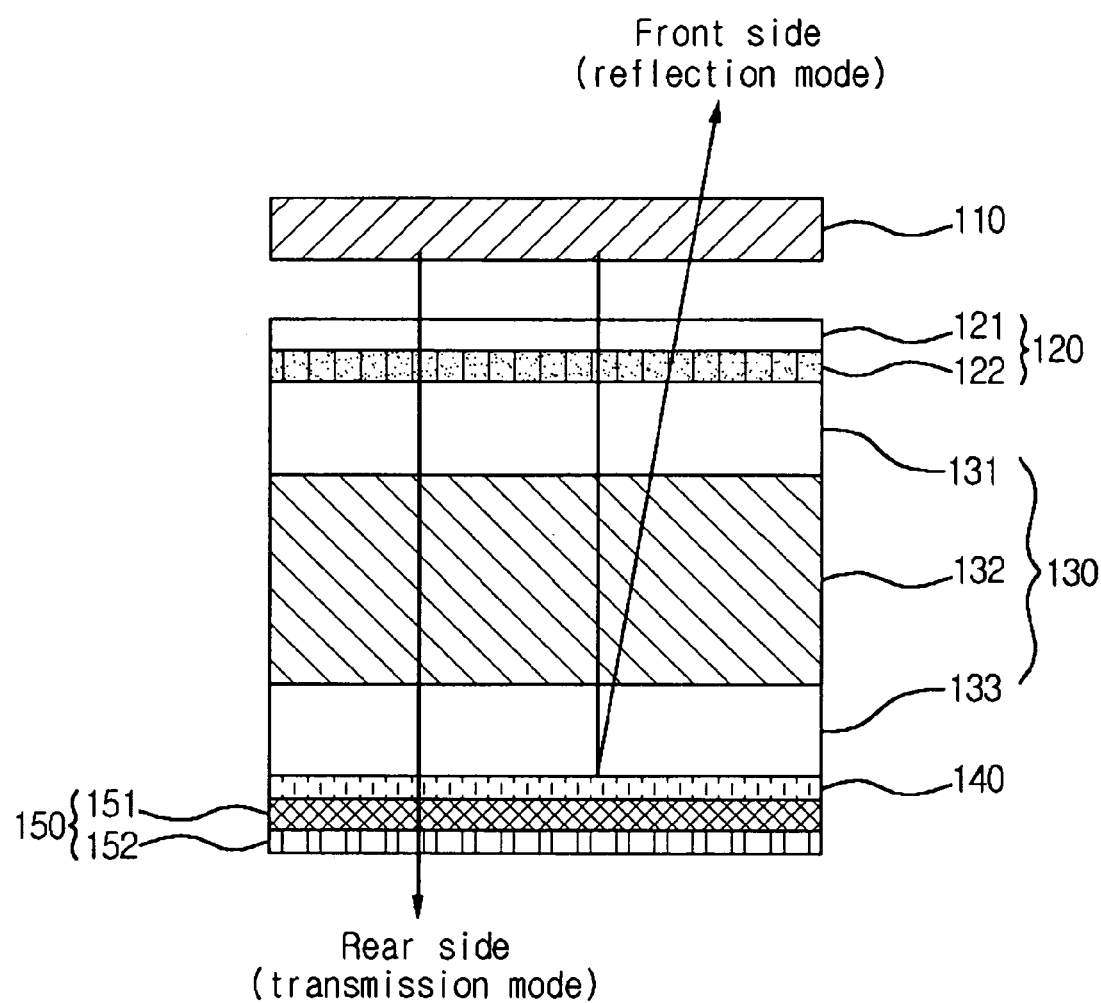
FIG. 1 is a schematic cross sectional view of an exemplary dual display LCD device according to the present invention.

FIG. 1 is a schematic cross sectional view of an exemplary dual display LCD device according to the present invention. in FIG. 1, a dual display LCD device may be configured to display images on a front side (in reflection mode) and on a rear side (in transmission mode) by using a single LCD panel 130. The dual display LCD device may include a front light unit 110, a first polarizing unit 120, a liquid crystal display (LCD) panel 130, a selective reflection/transmission unit 140 for selectively reflecting and transmitting light depending on predetermined polarization components, and a second polarizing unit 150. The front light unit 110 may be provided on the front side of the dual display LCD device to function as a light source and may include an optical wave-guide made of transparent material. A front surface of the front light unit 110 may be made of transparent material having a transmittance of about 50%. Accordingly, the light emitted from the light source may be reflected at the front surface of the front light unit 110 and transmitted to the rear side of the dual display LCD device. In addition, the light applied from the external side may also be incident into the LCD panel 130.

Figure 2:
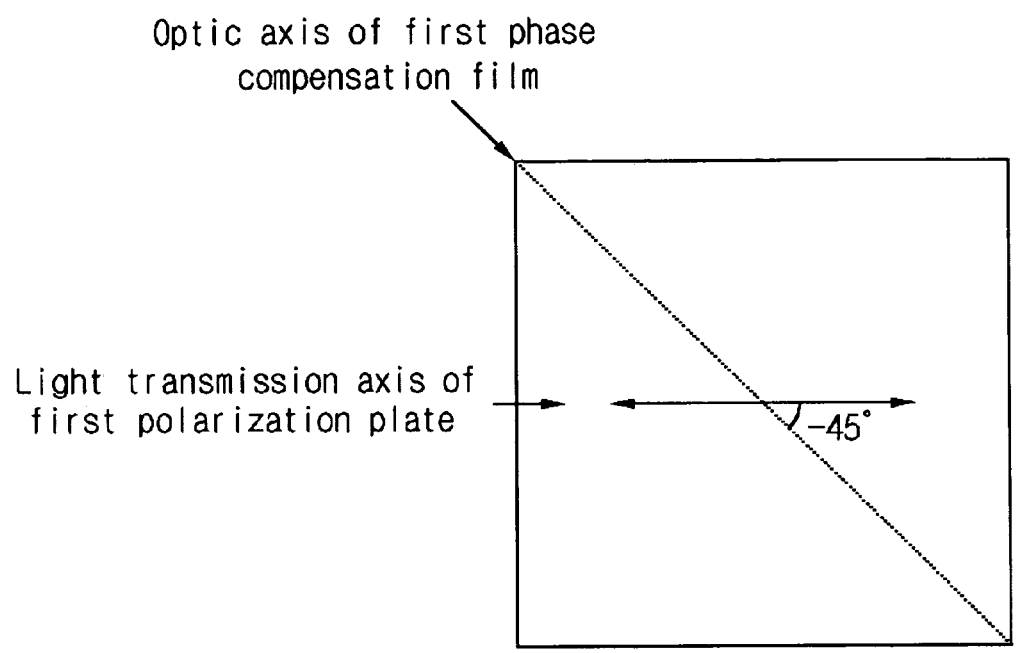
FIG. 2 is an optical element of an exemplary first polarizing unit employed in a dual display LCD device according to the present invention.

The first polarizing unit 120 may function to control polarization characteristics of the incident light, and may include a first polarizing plate 121 and a first phase compensation film 122 for generating a phase retardation of about $\lambda/4$. For example, the phase compensation film may be made of a quarter wave plate (QWP). The first polarizing plate 121 may be provided to transmit linearly polarized components of the incident light along an x-axis (horizontal axis) direction. As shown in FIG. 2, the optic axis of the first phase compensation film 122 may be slanted by an angle of about −45° with respect to x-axis.

In FIG. 1, light transmitted through the first polarizing unit 120 may be polarized to produce left-handed circularly polarized light. The polarization of the left-handed circularly polarized light may be adjusted when transmitted through an LCD panel 130. The LCD panel 130 may include a first substrate 131, a second substrate 133, and a liquid crystal layer 132 positioned between the first and second substrates 131 and 133. For example, the LCD panel 130 may include the first substrate 131 having a color filter, the liquid crystal layer 132, and the second substrate 133 having a TFT array. Alternatively, the LCD panel 130 may include the first substrate 131 having a TFT array, the liquid crystal layer 132, and the second substrate 133 having a color filter. The first and second substrates 131 and 133 may be made of glass or plastic material upon which low reflection processes may be performed. A black matrix material may be included in the LCD panel 130 having low reflection characteristics to block light emitted from the front light unit 110.

The liquid crystal layer 132 may be made of liquid crystal material having a phase retardation of about one-half wavelength ($\lambda/2$). Accordingly, when a voltage is not applied to the LCD panel 130, a half-wavelength phase retardation may be generated. Conversely, when a voltage is applied to the LCD panel 130, a phase retardation may not be generated.

Figure 3A:
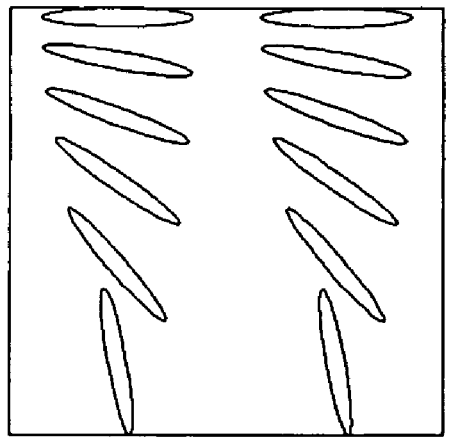
FIGS. 3A and 3B show liquid crystal arrangement/operating characteristics of an exemplary LCD panel employed in a dual display LCD device according to the present invention.
Figure 3B:
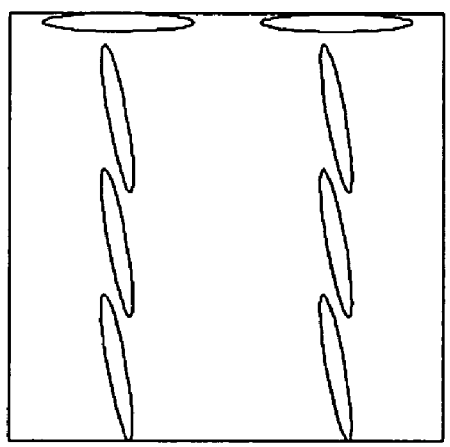

FIGS. 3A and 3B show liquid crystal arrangement/operating characteristics of an exemplary LCD panel employed in a dual display LCD device according to the present invention. According to the present invention, the dual display LCD device may include a selective reflection/ transmission unit 140 (in FIG. 1) for selectively reflecting and transmitting the light by using polarization characteristics to implement dual display functions by a single one of the LCD panel 130. In FIG. 3A, when a voltage is not applied to pixel and common electrodes, the liquid crystal molecules may have alignment directions that change along a gradient from a first surface to a second surface. In FIG. 3B, when a voltage is applied to pixel and common electrodes, the liquid crystal molecules may have a definite alignment direction perpendicular to first and second surfaces.

In FIG. 1, the selective reflection/transmission unit 140 may determine a transmission direction of the light (i.e., front side direction and rear side direction) so that an image display direction may be determined. For example, a cholesteric liquid crystal (CLC) material film may be provided for the selective reflection/transmission unit 140. Accordingly, the CLC film may selectively reflect and transmit right-handed circularly polarized light or left-handed circularly polarized light. Thus, the characteristics of the light may be selectively transmitted or reflected according to the polarization direction (i.e., right-handed circular polarization or left-handed circular polarization) of the light.

Figure 4:
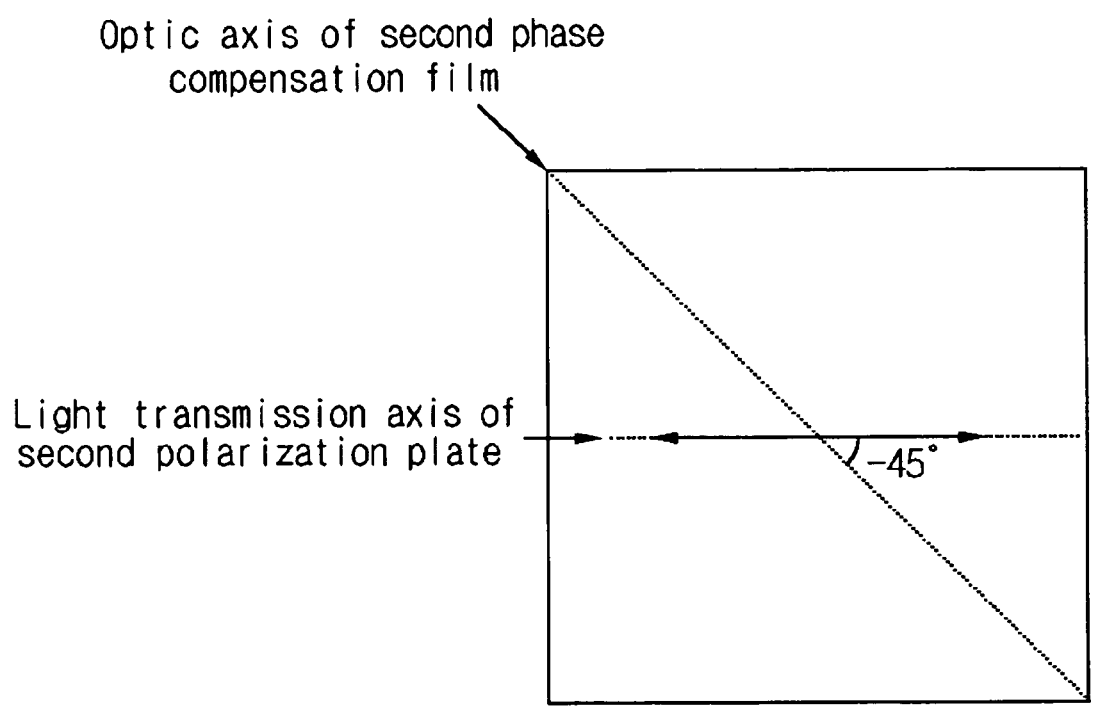
FIG. 4 is an optical element of an exemplary second polarizing unit employed in a dual display LCD device according to the present invention.
Figure 5:
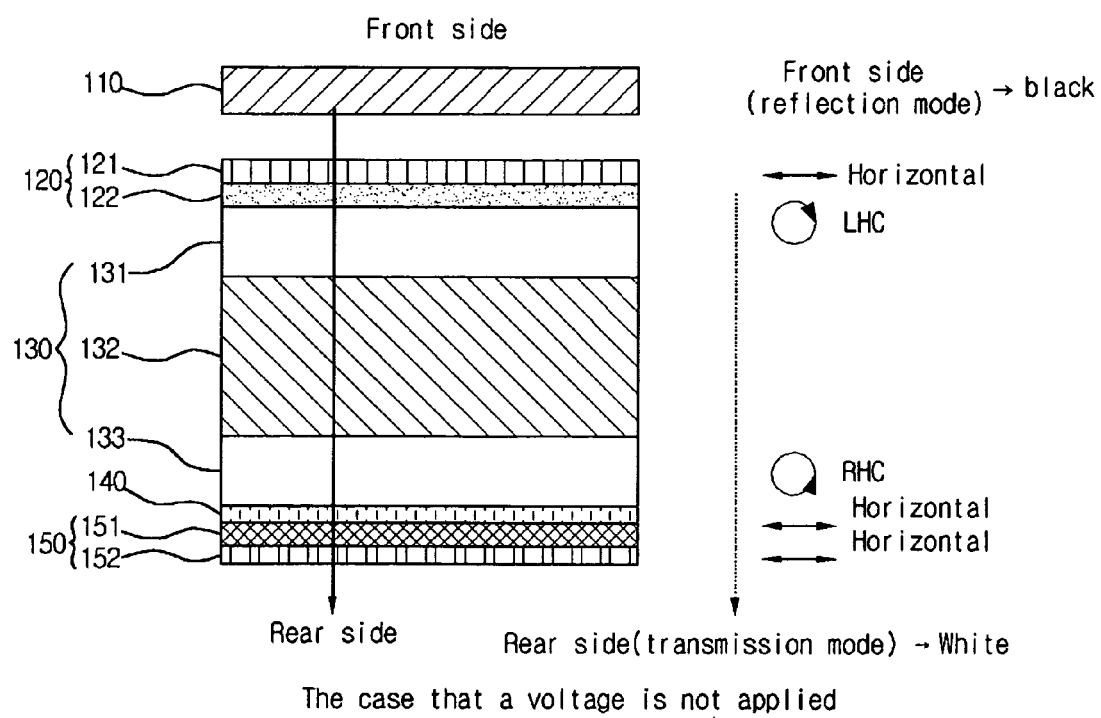
FIG. 5 is a cross sectional viewing demonstrating operational characteristics of an exemplary dual display LCD device in an LCD panel employed in the dual display LCD device according to the present invention.

FIG. 5 is a cross sectional viewing demonstrating operational characteristics of an exemplary dual display LCD device in an LCD panel employed in the dual display LCD device according to the present invention. In FIG. 5, a dual display LCD device may include a second polarization unit 150 for controlling polarization characteristics of transmitted light. The second polarization unit 150 may include a second compensation film 151 for generating a phase retardation of about $\lambda/4$ and a second polarization plate 152. For example, a quarter wave plate (QWP) may be used as the second compensation film 151. The second polarization plate 152 may be provided to transmit linearly polarized components of the incident light along an x-axis (horizontal axis) direction. As shown in FIG. 4, the optic axis of the second phase compensation film 151 may be slanted by an angle of about −45° with respect to x-axis. Accordingly, if right-handed circularly polarized light is incident to the second polarizing unit 150, linearly polarized light parallel with the x-axis may be transmitted.

In FIG. 5, when a voltage is not applied to an LCD panel 130 (i.e., phase retardation of half-wavelength is generated on the light transmitted through the LCD panel 130), the light (shown as ⇆) linearly polarized along the x-axis direction and transmitted through the first polarization plate 121 may be converted into the left-handed circularly polarized light (shown as LHC) and transmitted through the first phase compensation film 122.

Figure 6:
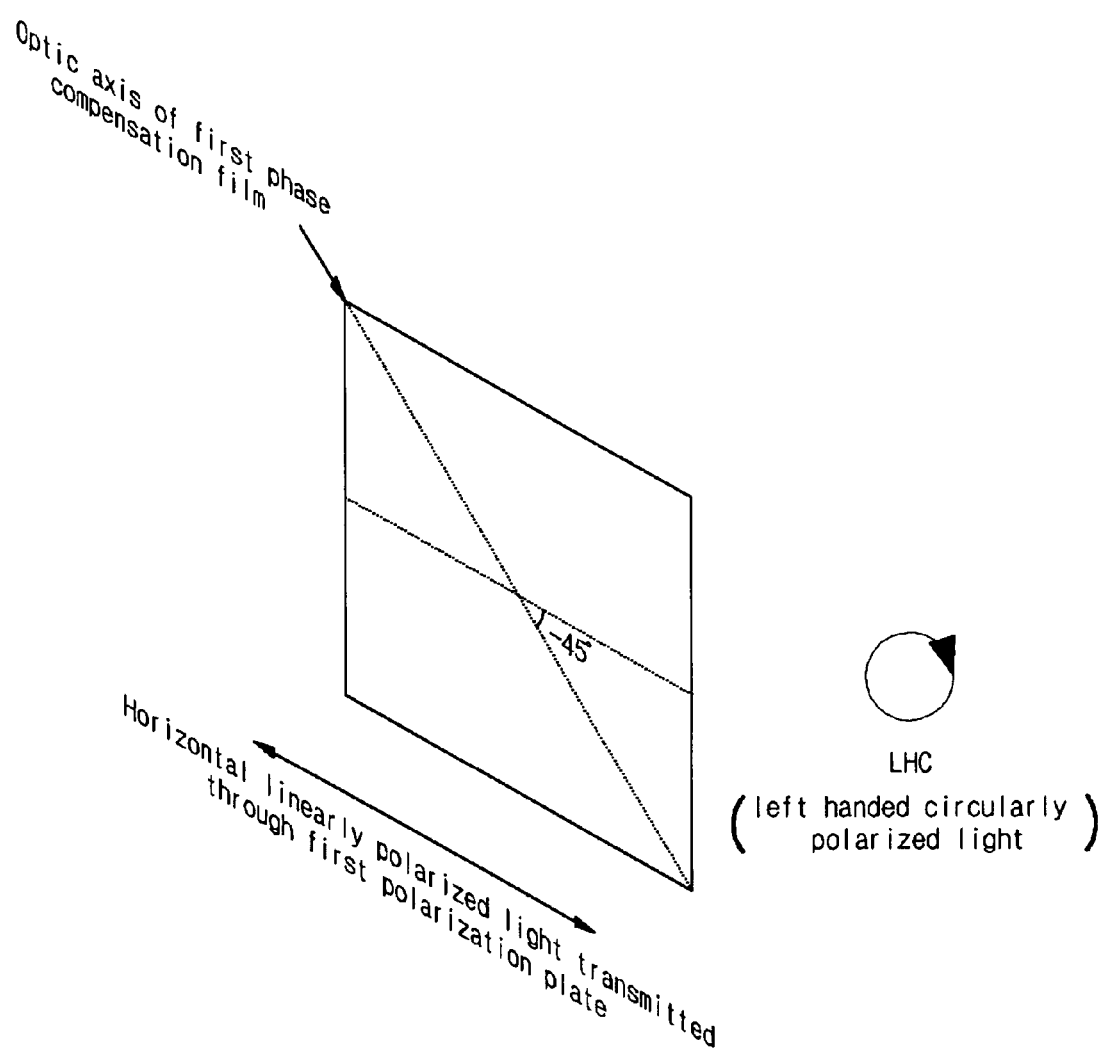
FIG. 6 shows variations of polarization characteristics in an exemplary first polarizing unit employed in a dual display LCD device according to the present invention.

FIG. 6 shows variations of polarization characteristics in an exemplary first polarizing unit employed in a dual display LCD device according to the present invention. In FIG. 6, the light (shown as LHC) left-handed circularly polarized and transmitted through the first polarization unit 120 may be converted into the right-handed circularly polarized light (shown as RHC) due to a phase retardation of one-half wavelength and transmitted through the LCD panel 130.

On the other hand, the light (RHC) right-handed circularly polarized after being transmitted through the LCD panel 130 may be fully transmitted through the selective reflection/transmission unit 140, which may comprise a CLC film. This is due to the characteristics of the CLC film to reflect the left-handed circularly polarized light and transmit the right-handed circularly polarized light. Accordingly, the right-handed circularly polarized light (RHC) transmitted through the selective reflection/transmission 140 may be converted into the light (shown as ⇆) linearly polarized along the x-axis direction while being transmitted through the second phase compensation film 151. The light (⇆) linearly polarized along the x-axis direction while transmitted through the second phase compensation film 151 may be fully transmitted through the second polarization plate 152 having a light transmission axis of the x-axis.

As a result, when a voltage is not applied to the LCD panel 130, all the light may be transmitted through a rear side (transmission mode) of the LCD device operated in the transmission mode so that the rear side (transmission mode) of the liquid crystal display device is in a "white" state. In addition, the light may not be reflected at the front side (reflection mode) of the LCD device operated in reflection mode so that the front side (reflection mode) of the LCD device is in a "black" state.

Figure 7:
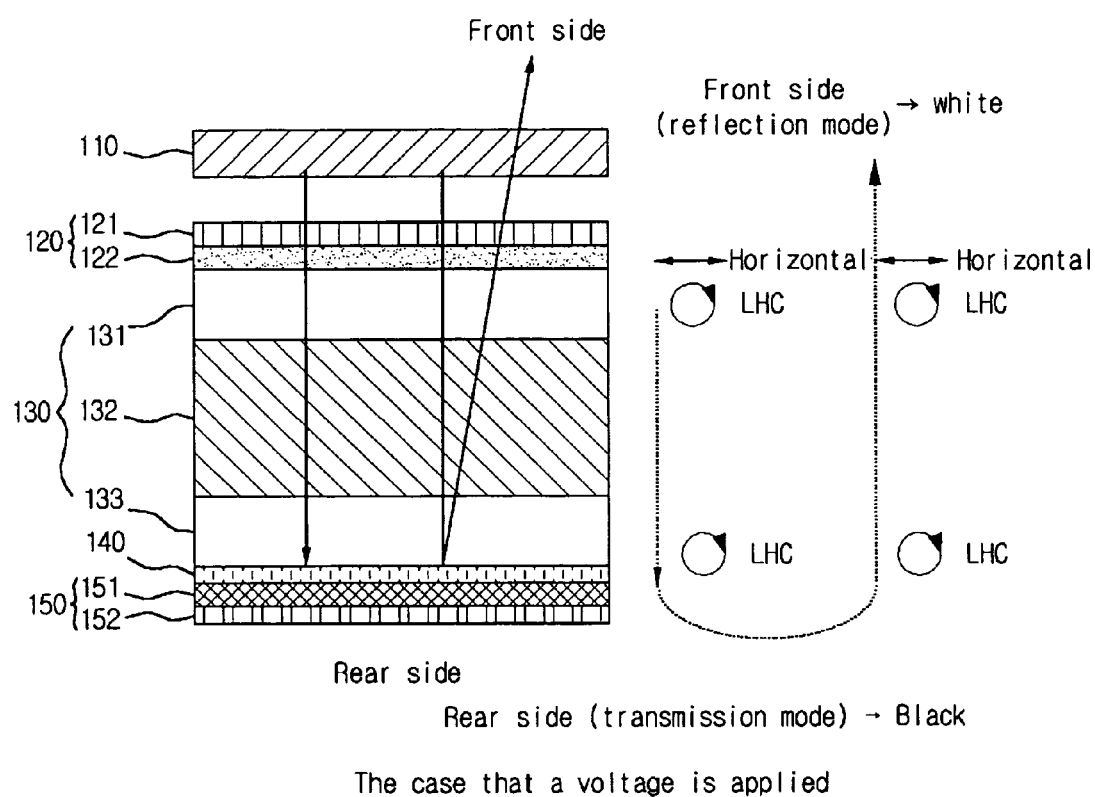
FIG. 7 is a cross sectional view demonstrating operational characteristics of an exemplary dual display LCD device in an LCD panel employed in the dual display LCD device according to the present invention.

FIG. 7 is a cross sectional view demonstrating operational characteristics of an exemplary dual display LCD device in an LCD panel employed in the dual display LCD device according to the present invention. In FIG. 7, when a voltage is applied to the LCD panel 130 (i.e., phase retardation is not generated on the light transmitted through the LCD panel 130), the light (⇆) linearly polarized along the x-axis direction while transmitted through the first polarization plate 121 may be converted into the left-handed circularly polarized light (LHC) while transmitted through the first phase compensation film 122. In addition, the light (LHC) left-handed circularly polarized while transmitted through the first polarization unit 120 may be transmitted through the LCD panel 130 and phase retardation may not be generated so that the left-handed circularly polarized light (LHC) remains.

On the other hand, the light (LHC) left-handed circularly polarized while transmitted through the LCD panel 130 may be fully reflected at the selective reflection/transmission unit 140, which may comprise a CLC film. The CLC film may be provided to reflect the left-handed circularly polarized light and transmit the right-handed circularly polarized light. Accordingly, due to the characteristics of the selective reflection/transmission unit 140, the reflected light from the selective reflection/transmission unit 140 may be the same circularly polarized light as the applied circularly polarized light so that the left circularly polarized light is reflected to the front side of the liquid crystal display device.

The left-handed circularly polarized light (LHC) transmitted through the selective reflection/transmission 140 may remain as the left-handed circularly polarized light (LHC) while transmitted through the LCD panel 130. The left-handed circularly polarized light (LHC) may be converted into the light (⇆) linearly polarized along the x-axis direction while transmitted through the first phase compensation film 122. Accordingly, the light (⇆) linearly polarized along the x-axis direction may be transmitted through the first polarization plate 121 that has light transmission axis of the x-axis.

As a result, when a voltage is applied to the LCD panel 130, the light is not transmitted through the rear side (i.e., transmission mode) of the liquid crystal display device operated in transmission mode. Thus, the rear side (i.e., transmission mode) of the LCD device may be in a "black" state. In addition, the light may be fully reflected at the front side (i.e., refection mode) of the LCD device operated in reflection mode so that the front side (i.e., reflection mode) of the LCD device may be in a "white" state. Thus, by operating the dual display LCD device as above, a dual display device can be realized using a single LCD panel.

Meanwhile, since the dual display LCD device configured as described above can be used as a dual display element, if the dual display LCD device is adapted to a mobile communication terminal (i.e., mobile portable communication device, PDA, etc.), images may be displayed in both directions, (i.e. on the front side and rear side) so that more image display functions may be realized in the mobile communication terminal. In addition, the mobile communication terminal may include a communication system for communicating with an external side, and a controller for controlling the communication system and the dual display LCD device and controlling a display direction of the images of the dual display LCD device.

For example, in the case of a folding-type mobile communication terminal, the direction to display an image may be set differently when the folding-type mobile communication terminal is open or closed. In addition, in the case of a sliding-type mobile communication terminal, a display direction to display an image may be set differently according to how much the image display slides.

In FIG. 1, in the LCD panel 130, the TFT array for controlling to display an image may be formed on one of the first and second substrates 131 and 133. Accordingly, when the TFT array is formed on the first substrate 131, the light applied from the front light unit 110 may be reflected at the TFT array. Thus, the reflected light may travel to the front side of the LCD device, thereby increasing a "black" brightness of the front side of the LCD device implemented in a reflection mode operation.

According to the dual display LCD device of the present invention, as shown in FIG. 1, a first phase compensation film 122 may be positioned at the first polarization unit 120. Thus, the increase of the "black" brightness at the front side of the LCD device implemented in reflection mode may be corrected. For example, as described above, the light transmitted through the first polarization unit 120 may be converted into the left-handed circularly polarized light (LHC) and may be partially reflected at the first substrate 131 upon which the TFT array is formed. In addition, the light reflected to the front surface of the LCD device may be converted into the right-handed circularly polarized light (RHC). The right-handed circularly polarized light (RHC) may be transmitted through the first phase compensation film 122 and may be converted into linearly polarized light along a direction of the y-axis. Since the first polarization plate 121 has the light transmission axis of the x-axis, all the light reflected at the TFT array may be blocked. Accordingly, in the dual display LCD device configured as the present invention, the light reflected from the TFT array may be prevented from effecting "black" brightness of the front side of the LCD device implemented in the reflection mode operation.

Figure 8:
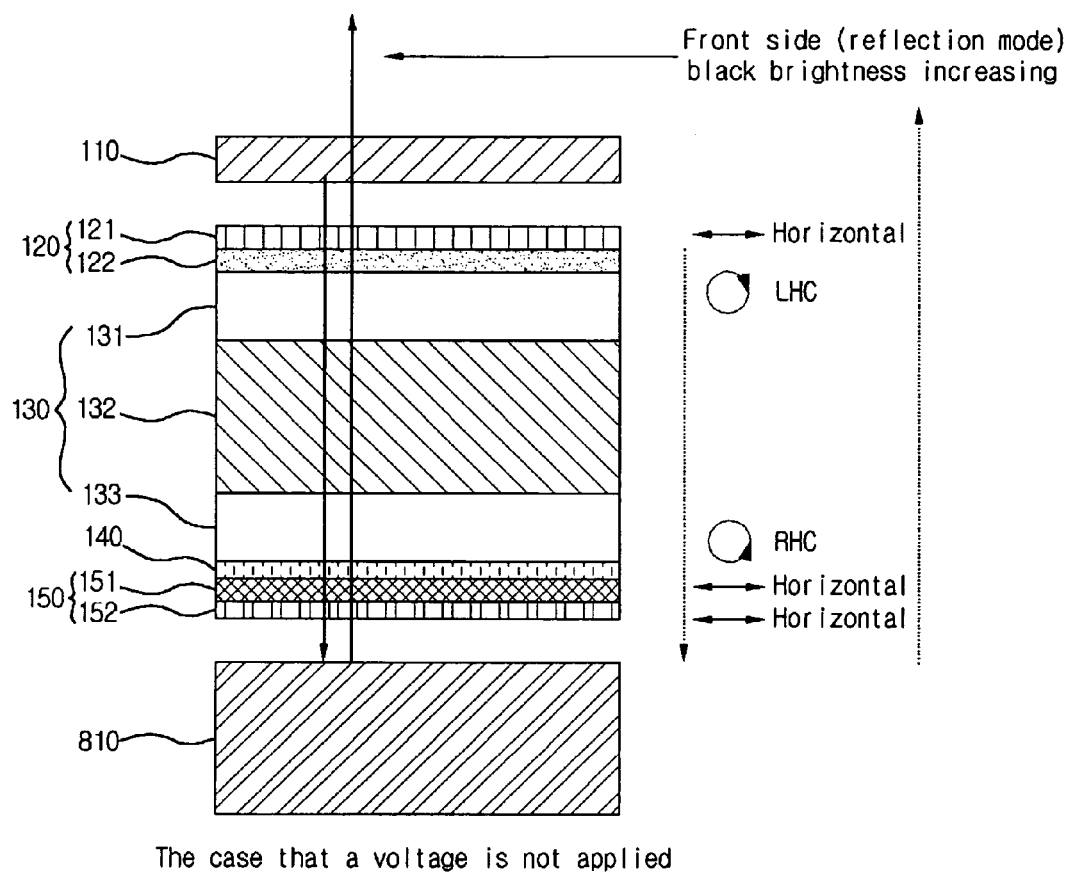
FIG. 8 is a cross sectional view of another exemplary dual display LCD device employed in a dual display terminal according to the present invention.

FIG. 8 is a cross sectional view of another exemplary dual display LCD device employed in a dual display terminal according to the present invention. When the dual display LCD device of the present invention is adapted to a dual image display of a folding-type mobile communication terminal, the transmitted light in transmission mode (i.e., when a voltage is not applied to an LCD panel) may be reflected at the reflection surface of the mobile communication terminal, such as a keypad 810. Accordingly, the "black" brightness of the front side implemented in reflection mode operation increases.

Figure 9:
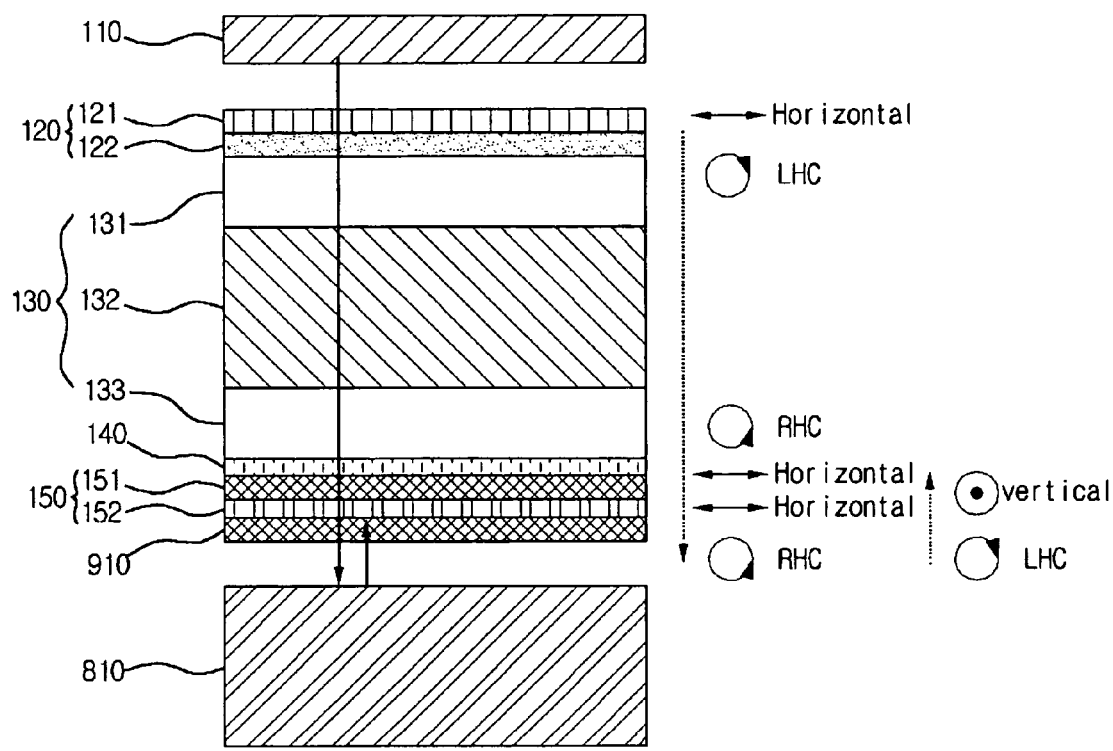
FIG. 9 is a cross sectional view of another exemplary dual display LCD device according to the present invention.

FIG. 9 is a cross sectional view of another exemplary dual display LCD device according to the present invention. In FIG. 9, a third phase compensation film 910 for generating a phase retardation of about λ/4 may be positioned on the rear surface of the second polarization plate 152. For example, a QWP may be used as the phase and the compensation film. As described above referring to FIGS. 5 and 7, it is similar to the implementation of dual image display through the rear side implemented by transmission mode operation and the front side implemented by reflection mode operation.

According to the dual display LCD device of the present embodiment, it is different from the dual display LCD device shown in FIG. 1 in that the third phase compensation film 910 may be provided. Accordingly, an operation difference (i.e., variation polarization characteristics of light) of the dual display LCD device is caused by the third phase compensation film 910. Thus, considering transmission mode operation (i.e., when a voltage is not applied to the LCD panel), as described above referring to FIG. 5, the light applied from the front light unit 110 may be transmitted through the second polarization plate 152 and converted into the light (⇆) linearly polarized along the x-axis (horizontal direction) direction.

When the direction of optic axis of the third phase compensation film 910 is slanted by about 45° from the x-axis, as shown in FIG. 9, the light (⇆) linearly polarized along the x-axis direction may be converted into the right-handed circularly polarized light (RHC). Accordingly, the right-handed circularly polarized light (RHC) may be transmitted through the rear side of the dual display LCD device implemented transmission mode operation.

When the right-handed circularly polarized light (RHC) transmitted through the rear side of the dual display LCD device is reflected at a reflection surface, such as keypad 810, the right-handed circularly polarized light (RHC) may be converted into the left-handed circularly polarized light (LHC) and applied to the third phase compensation film 910. Then, the left-handed circularly polarized light (LHC) applied to the third phase compensation film 910 may be converted into the light (shown as ⊙) linearly polarized along a y-axis direction. Accordingly, the linearly polarized light along the y-axis direction cannot be transmitted through the second polarization panel 152 having light transmission axis of the x-axis so that the light reflected at the keypad 810 cannot be transmitted to the front side of the dual display LCD device.

Similarly, according to the dual display LCD device of the present invention, a third phase compensation film 910 may be provided so that "black" brightness may be prevented from increasing at the front side of the dual display LCD device implemented in reflection mode operation due to the reflection of the keypad 810. On the other hand, when the direction of optic axis of the third phase compensation film 910 is slanted by about 45° from the x-axis, as described above, the direction of optic axis of the third phase compensation film 910 may be adjusted to be slanted by different angles from the x-axis.

For example, when the direction of optic axis of the third phase compensation film 910 is slanted by about −45° from the x-axis, the third phase compensation film 910 behaves as follows. First, considering the case when voltage is not applied to the LCD panel (i.e., transmission mode operation), as described referring to FIG. 5, the light applied from the front light unit 110 may be transmitted through the second polarization plate 152 and converted into the light (⇆) linearly polarized along the x-axis (horizontal direction) direction. The light (⇆) linearly polarized along the x-axis direction may be converted into the left-handed circularly polarized light (LHC). Accordingly, the left-handed circularly polarized light (LHC) may be transmitted through the rear side of the dual display LCD device implemented in the transmission mode operation.

Similarly, when the left-handed circularly polarized light (LHC) transmitted through the rear side of the dual display LCD device is reflected at the reflection surface, such as the keypad 810, the left-handed circularly polarized light (LHC) may be converted into the right-handed circularly polarized light (RHC) and applied to the third phase compensation film 910. Then, the right-handed circularly polarized light (RHC) applied to the third phase compensation film 910 may be converted into the light (shown as ⊙) linearly polarized along the y-axis direction. Accordingly, the light linearly polarized along the y-axis direction cannot be transmitted through the second polarization panel 152 having light transmission axis of the x-axis so that the light reflected at the keypad 810 cannot be transmitted to the front side of the dual display LCD device.

Similarly, according to the dual display LCD device of the present invention, a third phase compensation film 910 may be provided so that the reflection of the keypad 810 is prevented from effecting the light. As a result, "black" brightness may be prevented from increasing at the front side of the dual display LCD device implemented in reflection mode operation. On the other hand, when a voltage is applied to the LCD panel (i.e., reflection mode), as described referring to FIG. 7, the light applied from the front light unit 110 may be fully reflected at the selective reflection/transmission 140 and transmitted to the front surface of the dual display LCD device, wherein light reflected from the keypad 810 may not need to be considered.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A dual display liquid crystal display (LCD) device, comprising:
   a front light unit for supplying a light;
   a first polarizing plate disposed on the front light unit;
   a first phase compensation film disposed on the first polarizing plate;
   an LCD panel disposed on the first phase compensation film;
   a selective reflection/transmission unit disposed on the LCD panel;
   a second phase compensation film disposed on the selective reflection/transmission unit; and
   a second polarizing plate disposed on the second phase compensation film, wherein the selective reflection/transmission unit selectively reflects and transmits the incident light so that the dual display LCD device operates in reflection mode to display an image on a front side thereof in a first display mode and operates in a transmission mode to display an image on a rear side thereof in a second display mode.

2. The device according to claim 1, wherein the front light unit is provided with a light source at a side thereof.

3. The device according to claim 1, wherein the first phase compensation film and the second phase compensation film have optical axes arranged along a same direction.

4. The device according to claim 1, wherein the first phase compensation film and the second phase compensation film are composed of a quarter wave plate (QWP).

5. The device according to claim 1, wherein the selective reflection/transmission unit is composed of a cholesteric liquid crystal film.

6. The device according to claim 1, wherein the LCD panel generates a phase retardation of about $\lambda/2$ of the received light dependent upon whether or not a voltage is applied, or does not generate a phase retardation.

7. The device according to claim 1, further comprising a third phase compensation film disposed on the second polarizing plate.

8. The device according to claim 7, wherein the third phase compensation film is composed of a quarter wave plate (QWP).

9. The device according to claim 7, wherein the third phase compensation film has the same optical axis as that of the second phase compensation film.

10. The device according to claim 7, wherein the third phase compensation film has an optical axis different from that of the second phase compensation film by about 90°.

11. A method of operating a dual display LCD device, comprising the steps of:
    receiving light emitted from a front light unit and converting the received light into a circularly polarized light;
    allowing the circularly polarized light to be incident into an LCD panel and controlling one of a left-handed circular polarization and right-handed circular polarization of the light transmitted through the LCD panel according to an applied voltage; and
    allowing the light transmitted through the LCD panel to be incident into a selective reflection/transmission unit and selectively reflecting and transmitting the incident light at the selective reflection/transmission unit depending on the one of the left-handed circular polarization and right-handed circular polarization of the light transmitted through the LCD panel,
    wherein the dual display LCD device operates in reflection mode to display an image on a front side thereof in a first display mode and operates in a transmission mode to display an image on a rear side thereof in a second display mode.

12. A mobile communication terminal, comprising:
    a dual display LCD device comprising:
    a front light unit for supplying a light, a first polarizing plate disposed on the front light unit, a first phase compensation film disposed on the first polarizing plate, an LCD panel disposed on the first phase compensation film, a selective reflection/transmission unit disposed on the LCD panel, a second phase compensation film disposed on the selective reflection/transmission unit, and a second polarizing plate disposed on the second phase compensation film,
    wherein the dual display LCD device selectively reflects and transmits the light applied from the selective reflection/transmission unit so that the dual display LCD device operates in a reflection mode to display an image on a front side thereof in a first display mode and operates in a transmission mode to display an image on a rear side thereof in a second display mode;
    a communication system for communicating with an external side; and
    a controller for controlling the communication system and the dual display LCD device and controlling direction of displaying an image of the dual display LCD device.

13. A dual display LCD device, comprising:
    a front light unit for supplying a light;
    a first polarizing unit disposed on the front light unit;

an LCD panel disposed on the first polarizing unit;
a selective reflection/transmission unit disposed on the LCD panel; and
a second polarizing unit disposed on the selective reflection/transmission unit,
wherein the selective reflection/transmission unit selectively reflects and transmits the incident light so that the dual display LCD device operates in a reflection mode to display the image on a front side thereof in a first display mode and operates in a transmission mode to display an image on a rear side thereof in a second display mode, and
wherein the first polarizing unit comprises:
a single polarizing plate; and
a single phase compensation film for generating a phase difference of about $\lambda/4$ with respect to the light.

14. The device according to claim 13, wherein the front light unit is provided with a light source at a side thereof.

15. The device according to claim 13, wherein the phase compensation film is composed of a quarter wave plate (QWP).

16. The device according to claim 13, wherein the selective reflection/transmission unit is composed of a cholesteric liquid crystal film.

17. A dual display LCD device, comprising:
a front light unit for supplying a light;
a first polarizing unit disposed on the front light unit;
an LCD panel disposed on the first polarizing unit;
a selective reflection/transmission unit disposed on the LCD panel; and
a second polarizing unit disposed on the selective reflection/transmission unit,
wherein the selective reflection/transmission unit selectively reflects and transmits the incident light so that the dual display LCD device operates in a reflection mode to display the image on a front side thereof in a first display mode and operates in a transmission mode to display an image on a rear side thereof in a second display mode, and
wherein the second polarizing unit comprises:
a phase compensation film for generating a phase difference of about $\lambda/4$ with respect to the received light; and
a polarizing plate.

18. The device according to claim 17, wherein the phase compensation film is composed of a quarter wave plate (QWP).

19. A dual display LCD device, comprising:
a front light unit for supplying a light;
a first polarizing unit disposed on the front light unit;
an LCD panel disposed on the first polarizing unit;
a selective reflection/transmission unit disposed on the LCD panel;
a second polarizing unit disposed on the selective reflection/transmission unit; and
a phase compensation film disposed on the second polarizing unit,
wherein the selective reflection/transmission unit selectively reflects and transmits the incident light so that the dual display LCD device operates in a reflection mode to display the image on a front side thereof in a first display mode and operates in a transmission mode to display an image on a rear side thereof in a second display mode.

20. The device according to claim 19, wherein the phase compensation film is composed of a quarter wave plate (QWP).

21. A mobile communication terminal, comprising:
a dual display LCD device comprising:
a front light unit for supplying a light, a first polarizing unit disposed on the front light unit, an LCD panel disposed on the first polarizing unit, a selective reflection/transmission unit disposed on the LCD panel, and a second polarizing unit disposed on the selective reflection/transmission unit, wherein the selective reflection/transmission unit selectively reflects and transmits the incident light so that the dual display LCD device operates in a reflection mode to display an image on a front side thereof in a first display mode and operates in a transmission mode to display an image on a rear side thereof in a second display mode;
a communication system for communicating with an external side; and
a controller for controlling the communication system and the dual display LCD device and controlling direction of displaying the image of the dual display LCD devices,
wherein the first polarizing unit comprises:
a single polarizing plate; and
a single phase compensation film for generating a phase difference of about $\lambda/4$ with respect to the light.

* * * * *